July 5, 1932.  F. H. MACNEIL  1,866,364
ELECTRIC SWITCH AND INCLOSING STRUCTURE THEREFOR
Filed Feb. 20, 1929  2 Sheets-Sheet 1

Inventor.
Frederick H. Macneil

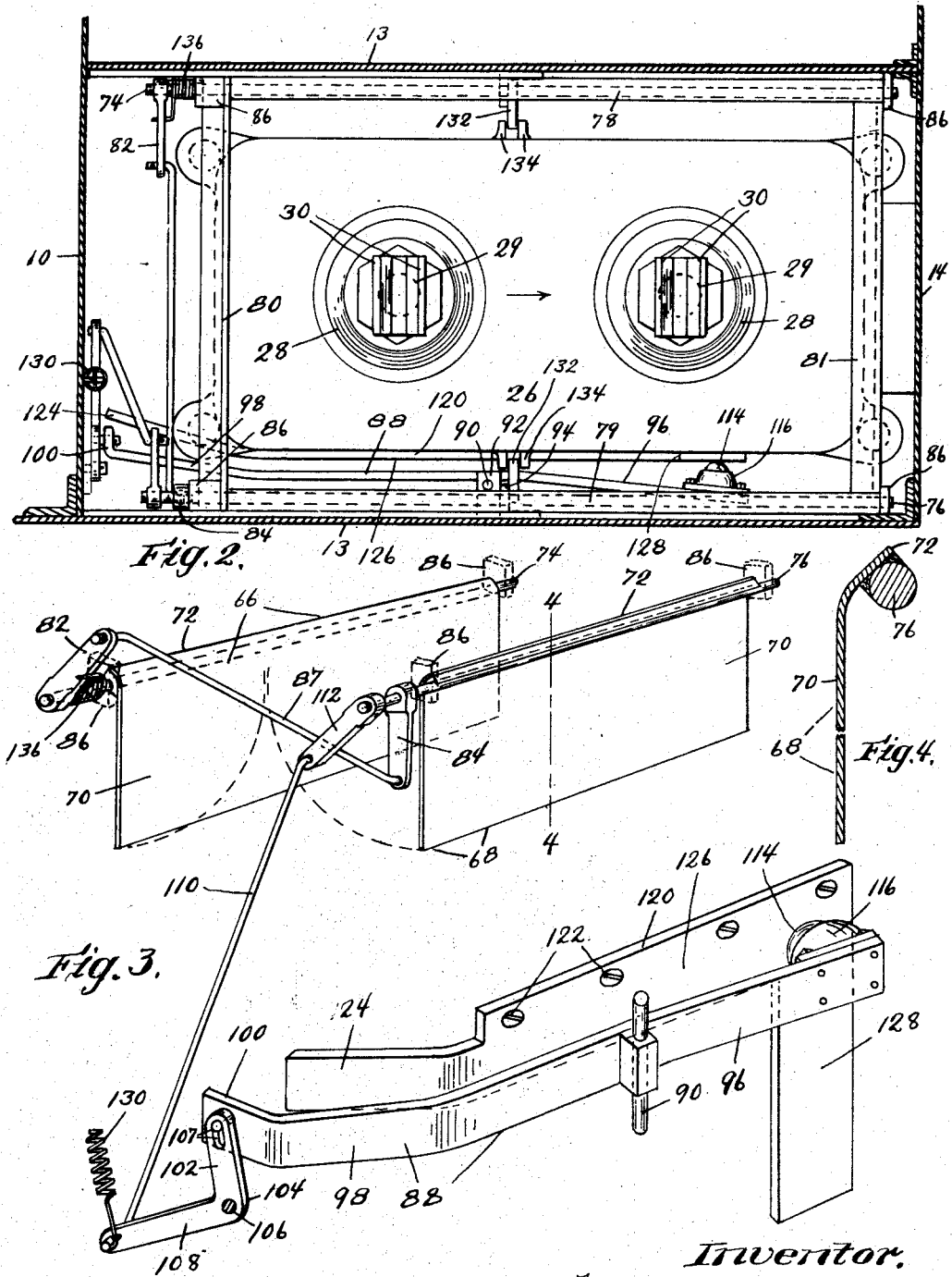

Patented July 5, 1932

1,866,364

UNITED STATES PATENT OFFICE

FREDERICK H. MACNEIL, OF BOSTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRIC SWITCH AND INCLOSING STRUCTURE THEREFOR

Application filed February 20, 1929. Serial No. 341,473.

This invention relates to cell-inclosed high tension electric switches of the truck type which are arranged to be moved horizontally to and from their inclosing cells and also when within their cells to be raised and lowered to move the contact terminals thereof into and out of engagement with cooperating fixed line terminals which are located within and are carried by the cell structure.

The bus bars, current transformers and other high tension apparatus are usually located in an inclosed compartment at the top or at the back of the cell structure and are connected to the terminals of high tension bushings which extend through the partition wall into the switch compartment of the cell. The exposed lower ends of said bushings carry the fixed high tension line terminals and are provided with suitable disconnect contact members which cooperate with the movable disconnect contact members carried by the switch to automatically connect the switch electrically with its circuit when the switch is moved to circuit controlling position in the cell.

When the switch is withdrawn from the cell, the fixed and live disconnect contact members are exposed and, unless isolating means for said members are provided, anyone working in or about the cell can easily come in contact therewith. It is therefore an object of this invention to provide an improved construction for automatically isolating these live contact members from the switch cell whenever the switch is withdrawn from the cell.

Various devices have been developed to prevent accidental contact with line disconnect contact members which become exposed by removal of the cooperating truck-switch unit, but these have usually involved recesses in the insulating bushings in which the fixed contact members are received and individual shutters automatically movable to obstruct the passage thereto upon separation of the cooperating disconnect contact members, or awkward and bulky screens arranged to be moved into position by the withdrawal of the switch. These devices are open to the objection that they are expensive to manufacture and are not economical of space.

It is therefore an object of this invention to provide an inclosed switch structure of this type having means to isolate the fixed contact members which does not necessitate the use of special bushings and in which there is no increase in the dimensions of the inclosing structure.

A further object is the provision of means to operate the isolating shutters by the movement of the switch to and from the cell and independently of the movement of the switch into and out of circuit controlling position in the cell.

A further object is the provision of an inclosed switch structure of this type provided with a barrier between the line disconnect members and the cell compartment, which barrier is movable downwardly and away from the high tension contact members thereabove as the switch is moved into the cell.

Another object is the provision of a pair of shutters which cooperate to isolate the line disconnect members and which move conjointly into and out of isolating position and which, when the switch is in operating position within the cell, lie alongside the opposite side walls of the cell.

A still further object is the provision of means for operating the isolating shutters to expose the live stationary disconnect members upon the initial movement of the switch into its cell and maintaining said shutters in operated position during the subsequent horizontal and also the vertical movement of the switch into and out of circuit controlling position in the cell.

A still further object is the provision of shutter-actuating mechanism carried by the cell structure and operating means therefor including a cam member carried by the removable truck unit having a cam face adapted to operate said shutter-actuating mechanism and a dwell face over which said actuating means is adapted to pass during the subsequent horizontal and vertical movement of the truck in the cell.

A yet further object is to improve the construction and operation of contact isolating shutters for inclosed draw-out electric switches.

Fig. 2 is a plan view taken on line 2—2 of Fig. 1.

Fig. 3 is a perspective view of the shutters and the operating mechanism therefor, the switch being shown within the cell but in its lowered position.

Fig. 4 is a section of a shutter taken along line 4—4 of Fig. 3, part of the shutters being broken away.

Figure 1:
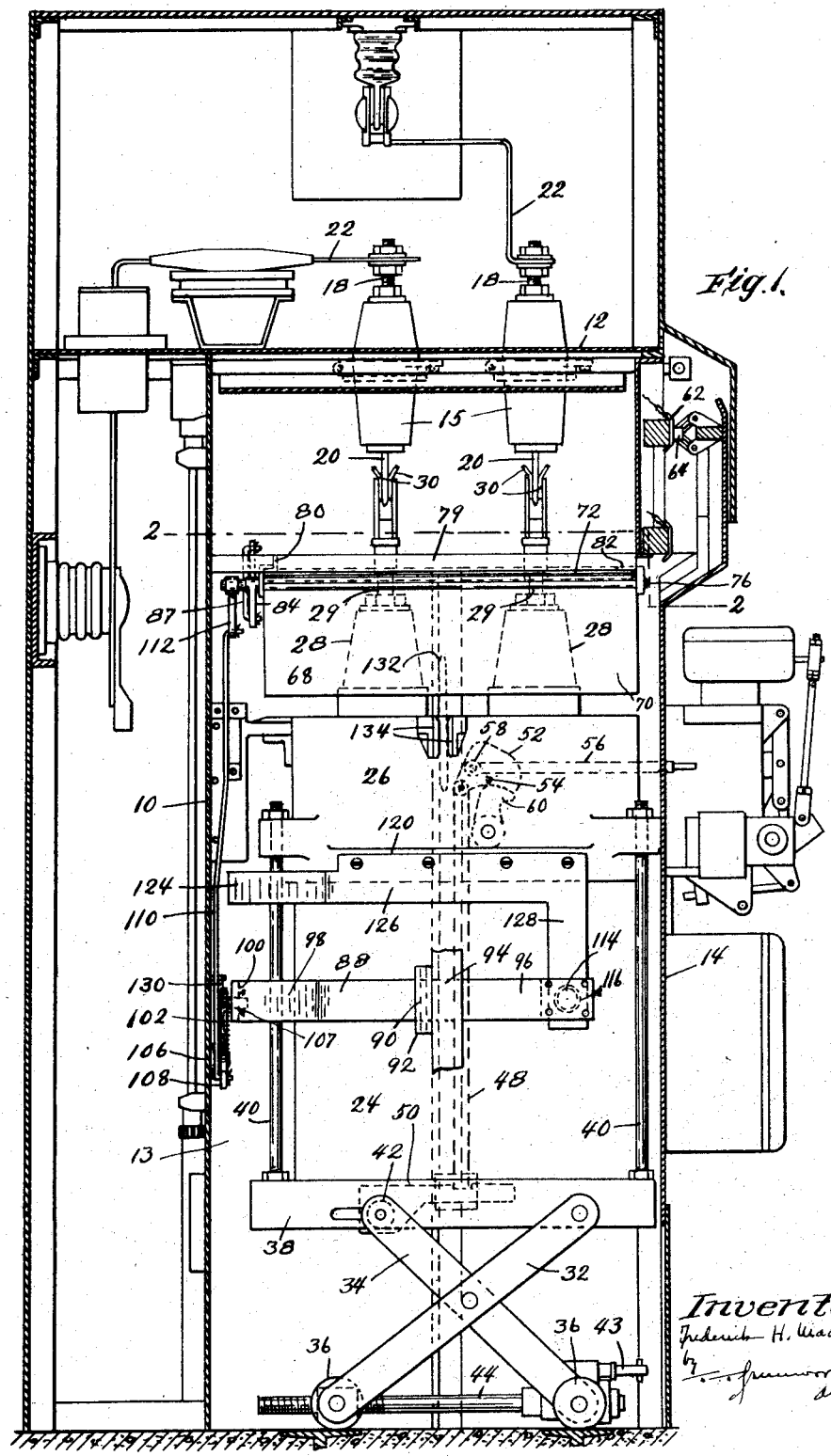
Fig. 1 is a side elevation of an inclosed electric switch embodying the invention, the inclosing cell structure being shown in section.

The inclosing cell structure here shown for the switch comprises the back wall 10, the top wall 12, the side walls 13, and the front wall 14, which latter wall is carried by and is movable with the switch and comprises a removable front closure for the cell when the switch is disposed therein. A pair of insulating bushings 15 extend through and are carried by the top wall 12 and support the vertically disposed conducting studs 18. Said studs are provided with lower extended end portions 20 which are in the form of knife blades and constitutes the stationary switch members of a pair of disconnecting switches of which the exposed terminals of the main switch form the cooperating movable members. Said studs 18 are connected electrically at their upper ends with line conductors 22.

The main switch, or circuit interrupter, herein shown is of the oil immersed truck type and comprises essentially an inclosing casing consisting of the oil containing receptacle 24, and the switch frame 26 which forms a closure for the open top of the oil receptacle. Stationary switch members including insulating bushings 28 and central conducting studs 29 are carried by said switch frame and extend therebelow into the oil in said oil receptacle and also extend above said switch frame to space the upper exposed ends of said studs suitably above the switch frame 26. Said studs are provided at their upper ends with contact clips 30 which comprise the movable switch members of the aforesaid disconnecting switches.

The interrupter is adapted to be supported above the floor at any one of a number of different elevations while within its cell and to this end is provided with self-contained raising and lowering means. Said means includes two similar pairs of crossed arms, or levers, 32 and 34, one pair being located on each side of the switch below the bottom thereof. Said arms are provided at their lower extreme ends with suitable switch supporting rollers 36 and at their upper ends the arms 32 are connected pivotally with a channel frame cradle 38 which is connected fixedly to said switch frame by the bolts 40. Said arms 34 are provided with a lost-motion connection with said channel frame, and rollers 42 are pivotally carried by the upper ends of said arms, which rollers bear against and roll along the inner face of said channel frame. The lower ends of said arms 32 and 34 are operatively connected and are adapted to be drawn together and to be spread apart by a shaft 44 carried by the arms 34 and having a screw-threaded connection at one end with the lower ends of arms 32. The shaft is adapted to be rotated by a detachable hand crank, not shown, which turns a shaft 43 having a geared-down connection with the shaft 44.

The interrupter is raised and lowered by rotating the shaft 44. It will be apparent that when the shaft 44 is rotated in one direction, the lower ends of bars 32 and 34 will be drawn toward each other thus to raise the interrupter; and that when the shaft is rotated in the reverse direction, the lower ends of the arms will be moved apart, thus to lower the interrupter. The interrupter is shown in Fig. 1 in fully raised position wherein the stationary and movable terminals 20 and 30 of the line disconnecting switch are in engagement. When in the fully lowered position the terminals of the interrupter will be at a lower position wherein they will be clear of the fixed line terminals and also below the front cell structure and therefore the interrupter can be rolled horizontally from the cell on the wheels 36.

Means are also provided to lock the raising and lowering means against operation except when the interrupter is in open position. Said means include a locking bar 48 which is adapted to engage an aperture in a member 50, which is slidable in the frame 38 as the arms 32 and 34 are moved to raise and lower the switch. Said locking bar 48 is pivotally connected with a cam plate 52 which is pivoted at 54 to the switch frame 26, and an operating lever 56 is also pivotally connected with said plate at 58. A cam 60 is operatively connected with the switch operating mechanism and said cam and cam plate cooperate to prevent the improper operation both of the switch and the raising and lowering means therefor. The above described elevating means for the switch and the interlocking means are more fully described and are claimed in a copending application of Morris B. Wood, Serial No. 281,151, filed May 28, 1928, and assigned to the assignee of this application, and need not be further described herein.

A plurality of secondary disconnecting switches are provided having fixed and movable contact members 62 and 64 carried by the cell and switch respectively which are adapted automatically to make and break engagement as the switch is raised and lowered in the cell for the purpose of controlling the circuit of the electrically-actuated interrupter-operating mechanism.

Certain novel features concerning the construction and operation of said secondary disconnecting switches are fully described and claimed in a copending application of Morris B. Wood, Serial No. 329,744, filed January 2, 1929, and assigned to the assignee of this application, but they form no part of the present invention.

In accordance with the present invention automatically operative means are provided, responsive to the movements of the switch into and out of its cell, to isolate the live contact terminals 20 of the line disconnecting switches from the remainder of the switch compartment of the cell whenever the switch is withdrawn therefrom. Said means include a pair of complemental shutter members 66 and 68 which are located within the cell under the line terminals 20. Said members are extended longitudinally between the front and rear of the cell and are pivotally supported adjacent the opposite side walls of the cell so that they can swing about horizontal axes from vertical positions adjacent the side walls into a horizontal position beneath the line terminals, wherein the members are in horizontal line with the free edges closely confronting each other. In this position the members practically completely close the cell space under the line terminals and over the interrupter space and so constitute a barrier which prevents accidental engagement with the line terminals when the interrupter is withdrawn from operative position. The shutter members are identical. Each comprises a stiff flat rectangular metal sheet 70 having one of its long edge portions reflexed to provide the angularly-related edge 72, see Figs. 3 and 4. Supporting shafts 74 and 76 are located in the angles between the body portions and reflexed edges of said shutters and are welded thereto, thereby to be fast thereto. The shafts extend in both directions beyond the short edges of the shutters.

The shutters are supported within the cell in a horizontal supporting frame which is disposed beneath the line terminals and consists of the horizontal longitudinal side members 78 and 79 and the transverse horizontal front and rear members 80 and 81. Said horizontal and transverse members are welded together; and the frame is welded to the side plates or walls of the cell, whereby to support the frame rigidly in position. The frame is provided, at the front and rear thereof, with depending lugs 86 in which the ends of the shutter shafts are journalled. When the shutters are in horizontal position, they are adapted to bear against the under faces of the frame members, which thus limit the movement of the shutters in their closing direction.

Said shutter members 66 and 68 are arranged for conjoint operation and to this end the similar ends of said shafts 74 and 76 thereof are provided with oppositely extended crank arms 82 and 84 which are fixed to their respective shafts and have their extended ends loosely connected by means of a connecting rod 87 whereby to link said shutter members together for conjoint rotation between horizontal and vertical positions.

When the interrupter is within the cell compartment, as shown in Fig. 1, the shutter members 66 and 68 occupy the vertical position shown in Figs. 1 and 3 wherein they lie closely adjacent to the side walls 13 of the cell and are well removed from the vicinity of the switch terminals and are entirely above the top of the interrupter casing. When the switch is completely withdrawn from the cell, so that the switch compartment therein is accessible, said shutter members are adapted to move simultaneously toward each other through an angle of 90° into a horizontally aligned position beneath the fixed line terminals whereby to substantially completely shut off that part of the switch cell above the horizontal frame members from the rest of the cell.

To this end, automatically operative means are provided to operate said shutter members between their separated, vertical position and their cooperative horizontal positions in response to corresponding movements of the switch out of and into the cell.

Said shutter operating means include the horizontal operating bar or lever 88 which is disposed between the cell wall 13 and the interrupter frame 26 and extends between the front and rear of the cell and is pivotally supported intermediate its ends by the vertical pivot pin 90. Said pin 90 is carried by vertically spaced arms of a U-shaped bracket 92 which is fixed to the vertical angle 94 on the side wall 13 of the cell. The arrangement permits a horizontal movement or swinging of said shutter operating bar. Said bar 88 is provided with oppositely reflexed end portions 96 and 98 and said end portion 98 is further provided with an inturned end 100 which is substantially parallel with the rear wall of the cell.

An upstanding arm 102 which comprises the shorter arm of a bell crank lever 104 pivoted at 106 to said back wall 10, is connected to said shutter-operating bar 88 by means of a pin and slot connection 107 whereby, upon horizontal movement of said bar 88 about its pivotal support, the bell crank 104 will be rotated about its pivot pin 106. Said bell crank has a second arm 108 angularly related to said arm 102 and extended along the rear cell wall 10, and said arm 108 is pivotally connected by means of a vertically extended rod 110 with a crank arm 112 which is carried by and is fixed against rotation on said shaft 76. The reflexed end-portion 96 of said shutter operating bar 88 is provided with a cam engaging roller 114 which comprises a ball rotatably mounted in a housing 116 secured removably to the inner face of said bar.

Means are provided on the switch to rotate said shutter operating bar 88 in response to movements of said switch into and out of the cell whereby to effect the opening of the shutters when the switch is moved into the cell and to hold them open during the vertical movement of the switch to and from circuit controlling position. Said means include a cam strip 120 which is secured to the side of the interrupter by bolts 122 and is provided with the horizontally reflexed roller engaging cam portion 124, the horizontal dwell portion 126, and the vertical dwell portion 128 over all of which said roller 114 is adapted to move successively during the horizontal movement of the switch into the cell and during the subsequent vertical movement to circuit controlling position therein.

A tension spring 130 connected between the arm 108 of said bell crank lever 104 and the rear cell wall 10 constantly urges said shutters into a closed, or horizontal, position and also urges the cam engaging portion 98 of said shutter operating bar 88 in a counter-clockwise direction (Fig. 2) about its pivot pin 90 into the path of cam strip 120.

It will be evident that when the switch is moved into the cell the cam roller 114 initially engages the reflexed cam portion 124 of the cooperating cam strip and as it moves over the face thereof causes clockwise rotation (Fig. 2) of the shutter operating bar 88 whereby to fully open the shutters before the switch members 28 have entered the cell a sufficient distance to interfere with the downward swinging travel thereof. Further movement of the switch into the cell causes the roller 114 to travel over the horizontal dwell portion 126 of said cam strip whereby to maintain the shutters in their open position. When the switch is fully within the cell and is in its lowered position the roller 114 and the cooperating cam strip 120 occupy the position shown in Fig. 3 wherein the roller is directly over the vertical dwell portion 128 of said cam strip. During the vertical movement of the switch into the circuit controlling position, illustrated in Fig. 1, the roller is adapted to travel over the aforesaid dwell portion 128 thus to maintain the shutters in open position.

Vertical guide strips 132 are carried by the side walls 13 and are arranged to be received between the bifurcations 134 of the switch frame 26 during the initial upward movement of the switch whereby to insure the proper engagement of the line disconnecting switches.

A helical spring 136 encircles one of the shutter shafts, as the shaft 74, and bears against the frame and also against the arm 82 of said shaft, whereby to urge the shutters into closed position, in addition to the spring 130.

The construction may be modified in many ways without exceeding the scope of the invention.

I claim:

1. In an inclosed draw-out electric switch gear, the combination of cooperating stationary and movable portions, said movable portion adapted to be moved horizontally and thereafter vertically in the cell, cooperating fixed and movable line disconnects carried by said stationary and movable portions, means to isolate the fixed disconnects from the remainder of the switch cell whenever the switch is withdrawn therefrom, and means carried by the switch adapted to render said isolating means ineffective during the movement of the switch into the cell and thereafter during its vertical movement to circuit controlling position.

2. In an inclosed draw-out switch gear, the combination of an inclosing cell, a truck type switch adapted to be moved horizontally thereinto and thereafter to be moved vertically into and out of circuit controlling position in the cell, fixed contact members carried by said cell, cooperating contact members carried by the switch arranged automatically to engage said fixed contact members when the switch is moved into circuit controlling position, shutter mechanism adapted to be interposed between the switch and the body of the cell to isolate said fixed terminals from the cell when the switch is out of the cell, and means carried by the switch to operate said shutter mechanism to expose said fixed contact members during the horizontal movement of the switch into the cell and to hold said mechanism in such condition during the vertical movement of the switch in the cell.

3. In an inclosed draw-out electric switch gear of the type including an inclosing cell and a truck type switch movable horizontally thereinto and thereafter movable vertically to bring the switch terminals thereof into engagement with cooperating fixed line terminals carried by the cell, the combination of a flat shutter member rotatable about an axis parallel to the line of horizontal movement of said switch from a vertical to a horizontal position in response to the horizontal movement of said truck from said cell, said shutter member when in its horizontal position underlying and when in its vertical position being disposed at one side of the fixed line terminals, and means to hold said shutter member in its vertical position during the vertical movement of the switch in the cell.

4. An inclosed electric switch gear including an inclosing cell structure, a truck type switch adapted to be moved horizontally into said cell and thereafter to be raised and lowered therein into and out of engagement with the fixed line disconnects carried by said cell structure, means to isolate said fixed line terminals from the remainder of the cell, means responsive to the horizontal movement of said switch into and out of said cell to move said isolating means out of and into terminal isolating position, and means carried by the switch to maintain said isolating means out of isolating position during the vertical movement of the switch in the cell.

5. In an inclosed electric switch gear, the combination of an inclosing cell, a truck switch horizontally movable thereinto, fixed terminals disposed in the upper portion of said cell adapted to cooperate with the terminals of said switch to connect said switch with its circuit, a shutter member horizontally rotatable about an axis parallel to the line of movement of said truck into the cell and at one side of said fixed terminals and movable between a horizontal position beneath all of said fixed line terminals and a vertical position at one side thereof by the movement of the switch into the cell.

6. In an electric switch gear comprising an inclosing cell and a truck type switch which is adapted to be moved horizontally into and out of said cell, fixed contact members carried by and disposed in the upper portion of said cell, cooperating movable contact members carried by said switch, a flat shutter, a horizontal rotatable shaft located adjacent a vertical wall of said cell on which said shutter is supported, said shutter being rotatable between a horizontal position in which it screens said fixed contact members and a vertical position in which it lies parallel to and closely adjacent the vertical plane of wall, and cooperating means carried by said switch and cell structure arranged to move said shutter automatically between its horizontal and vertical positions when said switch is moved out of and into said cell.

7. In an electric switch gear comprising an inclosing cell and a truck type switch movable horizontally into and out of said cell, fixed contact members comprising line terminals carried by said cell compartment in the upper portion thereof, cooperating contact members carried by said switch, a shutter normally biased into a horizontal position rotatably supported on a horizontal axis adjacent and parallel to the vertical plane of a wall of said cell, said shutter being rotatable between a horizontal position wherein it screens said line terminals from the remaining cell compartment, and a vertical position wherein it lies in a plane parallel to and closely adjacent said cell wall, shutter operating means carried by said cell structure for moving said shutter between the aforesaid positions, and actuating means carried by said switch arranged to cooperate with said operating means to operate said shutter in response to horizontal movement of said switch into and out of said cell.

8. In an electric switch gear comprising an inclosing cell and a truck type switch adapted to be moved horizontally into and out of said cell, fixed disconnecting switch contacts carried by and disposed in the upper portion of said cell, a flat shutter pivotally mounted on a horizontal axis located closely adjacent the vertical plane of a wall of said cell and adapted to occupy a horizontal position to screen said fixed contacts and to swing downwardly away from said horizontal position into a vertical position closely adjacent said supporting cell wall, means to bias said shutter constantly into its horizontal position, and cooperating means carried by said cell and switch arranged to move said shutter against its bias into its alternative position in response to movement of the switch into the cell.

9. In an electric switch gear, the combination of an inclosing cell, a truck type switch movable horizontally into and out of said cell and thereafter adapted to be raised and lowered in said cell, fixed terminals comprising the stationary contact members of line disconnecting switches disposed in the upper portion of said cell compartment, movable contact members carried by said switch and adapted to cooperate with said fixed contact members when the switch is moved to its elevated position in the cell, means to isolate the upper portion of said cell from the remaining cell compartment when the switch is withdrawn therefrom, whereby to completely inclose said fixed line terminals, said means comprising a pair of complemental shutter members pivotally supported at opposed walls of said cell and adapted to occupy an aligned horizontal position when said switch is withdrawn from the cell and parallel vertical positions when the switch is disposed in the cell, and means carried by said cell and switch arranged to operate said shutter members between the aforesaid positions in response to the horizontal movement of said switch into and out of said cell.

10. In a draw-out electric switch gear, the combination of an inclosed cell structure, a truck type switch adapted to be moved horizontally into and out of said cell and when within said cell to be raised and lowered therein into and out of circuit controlling position, fixed contact members of line disconnecting switches carried by and disposed in the upper portion of said cell, cooperating movable contact members carried by said switch, a shutter rotatable about a horizontal axis which is at one side of said fixed contact members between a vertical position and a horizontal position, in which latter position it is adapted to partition the upper portion of said cell containing said fixed line terminals from the remainder of the cell compartment, means normally biasing said shutter into a horizontal position, shutter operating mechanism carried by said cell for moving said shutter about its axial support, and cooperating means carried by said switch arranged to engage said operating mechanism upon movement of the switch into the cell and move said shutter against its bias into its vertical contact exposing position.

11. In a draw-out electric switch gear, the combination of an inclosing cell structure, a truck type switch movable horizontally into and out of said cell and also movable vertically therein to effect the engagement and disengagement of its switch terminals with the fixed line contact members of line disconnecting switches carried by said cell in the upper portion thereof, a shutter movable between a vertical cell and a horizontal position in which latter position it is adapted to partition said fixed contact members from the cell compartment, means normally biasing said shutter into its horizontal contact screening position, operating means carried by the cell structure for moving said shutter against its bias into its vertical contact exposing position, said mechanism including a pivoted horizontally movable lever having a cam follower, and a cam member carried by said switch arranged to engage said follower upon the initial movement of said switch into said cell.

12. In a draw-out electric switch gear, the combination of an inclosing cell structure, a truck type switch movable horizontally into and out of said cell and also movable vertically therein to effect the engagement and disengagement of its switch terminals with the fixed line contact members of line disconnecting switches carried by said cell in the upper portion thereof, a shutter movable between a vertical and a horizontal position in which latter position it is adapted to partition said fixed contact members from the cell compartment, means normally biasing said shutter into its horizontal contact screening position, operating means carried by the cell structure for moving said shutter against its bias into its vertical contact exposing position, said mechanism including a pivoted horizontally movable lever having a cam follower, and a cam member carried by said switch arranged to engage said follower upon the initial movement of said switch into said cell, said cam member having a horizontal dwell face over which said cam follower is adapted to pass during the horizontal movement of the switch into and out of said cell and also having a vertical dwell face over which said follower is adapted to pass during the vertical movements of the switch therein.

13. Electric switch gear having a cell, an interrupter movable into and out of the cell, a disconnecting switch having fixed line terminals carried by and depending into the cell and movable terminals carried by the interrupter, and shielding means for isolating the fixed terminals from the rest of the cell including a pair of complemental shutters which are hinged horizontally to said cell on opposite sides of said fixed terminals and which swing concurrently into and out of a common horizontal plane in confronting relation with each other under said terminals.

14. Electric switch gear having a cell, an interrupter movable into and out of the cell, a disconnecting switch having fixed terminals carried by and depending into the cell and movable terminals carried by the interrupter, and shielding means for the fixed terminals including a pair of complemental shutters which are hinged horizontally to said cell on opposite sides of said fixed terminals and which swing concurrently into and out of a common horizontal plane in confronting relation with each other under said terminals in response to movements of said interrupter out of and into the cell, each shutter occupying about one half the width of the cell when they are in confronting relation.

15. Electric switch gear having a cell, an interrupter movable into and out of the cell and having an inclosing casing, a disconnecting switch having depending fixed terminals located in the cell and movable terminals which are carried by and upstand above the interrupter and casing, and shielding mechanism for isolating said fixed terminals from the rest of the cell including a pair of cooperating separately-hinged shutters which are movable concurrently in response to movement of the interrupter out of the cell from a vertical position wherein they are parallel with the opposite sides of the cell and are above the interrupter casing into a confronting horizontal position under said fixed terminals.

16. Electric switch gear having a cell, an interrupter movable into and out of the cell, a disconnecting switch having fixed terminals located in the cell and movable terminals carried by the interrupter, and shielding mechanism for isolating the fixed terminals from the rest of the cell including a pair of shutters normally located in a common horizontal plane with their inner ends confronting under the fixed terminals and having horizontal pivotal supports for their remote outer ends, and said shutters having provision for concurent movement about their pivotal supports away from confronting relation and into a vertical terminal-exposing position upon initial movement of said interrupter into said cell.

17. Electric switch gear having a cell, an interrupter movable into and out of the cell, a disconnecting switch having fixed terminals located in the cell and movable terminals carried by the interrupter, and shielding mechanism for isolating the fixed terminals from the rest of the cell including a pair of shutters located in a common horizontal plane with their adjacent inner ends confronting under the fixed terminals and having horizontal pivotal supports for their remote outer ends, and said shutters having provision for movement about their pivotal supports away from confronting relation and into a vertical terminal-exposing position, and means biasing said shutters to remain in confronting relation.

18. The combination of an inclosing cell, an interrupter movable horizontally into and out of and also vertically within said cell, a disconnecting switch having fixed terminals carried by said interrupter, isolating mechanism for said fixed terminals including shutters movable into and out of confronting relation in front of said fixed terminals, a movable shutter operating member, and a cam member carried by said interrupter having a horizontal section which engages said shutter operating member and actuates it to open said shutters, said cam member having a neutral section which maintains said shutter operating member in an actuated position during vertical movement of said interrupter within said cell.

19. Electric switch gear having a cell, an interrupter movable into and out of said cell, a disconnecting switch having spaced fixed terminals carried by said cell, and movable terminals located in said interrupter, and isolating mechanism for said spaced fixed terminals consisting of complemental shutters having hinged supports on opposite sides of said fixed terminals whereby said shutters can swing about axes which are parallel with the line of said fixed terminals into a common plane in front thereof, the confronting ends of said shutters being in line with and in front of said fixed terminals.

20. An electric switch gear comprising an inclosing cell, fixed line terminals located within said cell, a switch which has terminals and is movable to bring its terminals into and out of engagement with said fixed line terminals, and shutter mechanism for isolating said line terminals when the switch is out of operative relation therewith, said shutter mechanism including a pair of shutter members which are disposed within said cell on opposite sides of said line terminals and are hinged to said cell at their outer ends in the line of said line terminals, said shutter members being movable from a position wherein they are substantially parallel with said line terminals and expose said line terminals between them into a position wherein the inner ends are disposed in closely confronting relation in front of said line terminals and wherein the shutters are substantially at right angles to said line terminals.

21. An electric switch gear comprising an inclosing cell, fixed line terminals located within said cell, a switch which has terminals and is movable to bring its terminals into and out of engagement with said fixed line terminals, shutter mechanism for isolating said line terminals when the switch is out of operative relation therewith, said shutter mechanism including a pair of shutter members which are disposed within said cell on opposite sides of said line terminals and are hinged to said cell at their outer ends in the line of said line terminals, said shutter members being movable from a position wherein they are substantially parallel with said line terminals and expose said line terminals between them into a position wherein the inner ends are disposed in closely confronting relation in front of said line terminals and wherein the shutters are substantially at right angles to said line terminals, and operating mechanism for said shutter mechanism including means which swings both of said shutters simultaneously in the same sense between said two positions.

22. An electric switch gear comprising an inclosing cell, fixed line terminals located within said cell, a switch which has terminals and is movable to bring its terminals into and out of engagement with said fixed line terminals, shutter mechanism for isolating said line terminals when the switch is out of operative relation therewith, said shutter mechanism including a pair of shutter members which are disposed within said cell on opposite sides of said line terminals and are hinged to said cell at their outer ends in the line of said line terminals, said shutter members being movable from a position wherein they are substantially parallel with said line terminals and expose said line terminals between them into a position wherein the inner ends are disposed in closely confronting relation in front of said line terminals and wherein the shutters are substantially at right angles to said line terminals, operating mechanism for said shutter mechanism including means which swings both of said shutters simultaneously in the same sense between said two positions, and means carried by the switch which operates said operating mechanism in the aforesaid manner upon predetermined movements of said switch.

23. An electric switch gear comprising an inclosing cell, fixed line terminals located within said cell, a switch which has terminals and is movable to bring its terminals into and out of engagement with said fixed line terminals, shutter mechanism for isolating said line terminals when the switch is out of operative relation therewith, said shutter mechanism including a pair of shutter members which are disposed within said cell on opposite sides of said line terminals and are hinged to said cell at their outer ends in the line of said line terminals, said shutter members being movable from a position wherein they are substantially parallel with said line terminals and expose said line terminals between them into a position wherein the inner ends are disposed in closely confronting relation in front of said line terminals and wherein the shutters are substantially at right angles to said line terminals, and operating mechanism for said shutter mechanism including means which swings both of said shutters simultaneously in the same sense between said two positions, said shutter operating mechanism including arms fixed to the pivoted ends of said shutters, a link connected with one of said arms, a switch operated lever and means operatively connecting said lever with one of said shutters and rotating it and said other shutter.

24. Electric switch gear comprising an inclosing cell having line terminals in the upper part and a removable switch having line terminals in the lower part, and means to isolate the upper part of the cell and the line terminals therein from the lower part of the cell comprising complemental swinging shutter members which are located under the line terminals and are hinged to opposite walls of the cell and swing concurrently from a vertical position upwardly into a horizontal position where their confronting free ends are juxtaposed beneath the line terminals, the interior of the cell being vertically unobstructed downwards of the line terminals when the shutters are in vertical position.

In testimony whereof, I have signed my name to this specification.

FREDERICK H. MACNEIL.

CERTIFICATE OF CORRECTION.

Patent No. 1,866,364. July 5, 1932.

FREDERICK H. MACNEIL.

It is hereby certified that error appears in the printed specification of the above numbered patent requiring correction as follows: Page 5, line 41, claim 6, afther "of" insert the words said cell; page 7, line 36, claim 19, for "carried by" read located in and line 37, for "located in" read carried by; and that the said Letters Patent should be read with these corrections therein that the same may conform to the record of the case in the Patent Office.

Signed and sealed this 1st day of November, A. D. 1932.

(Seal)

M. J. Moore,
Acting Commissioner of Patents.